(12) United States Patent
Wang et al.

(10) Patent No.: US 8,033,444 B2
(45) Date of Patent: Oct. 11, 2011

(54) EXPLOSION WELDING WITH A MOLD AND COPPER LAYER

(76) Inventors: YaoHua Wang, NanJing (CN); Hui Wang, Salt Lake City, UT (US)

( * ) Notice: Subject to any disclaimer, the term of this patent is extended or adjusted under 35 U.S.C. 154(b) by 0 days.

(21) Appl. No.: 12/705,926

(22) Filed: Feb. 15, 2010

(65) Prior Publication Data

US 2010/0206939 A1   Aug. 19, 2010

(51) Int. Cl.
*B23K 20/08*   (2006.01)
(52) U.S. Cl. ........................................... 228/107
(58) Field of Classification Search ........... 228/107–109
See application file for complete search history.

(56) References Cited

U.S. PATENT DOCUMENTS

| | | | | |
|---|---|---|---|---|
| 3,397,444 A | * | 8/1968 | Bergmann et al. | 228/108 |
| 3,740,826 A | * | 6/1973 | Baba | 228/107 |
| 3,798,011 A | * | 3/1974 | Sharp, Jr. | 138/143 |
| 4,120,439 A | * | 10/1978 | Persson | 228/107 |
| 4,669,649 A | * | 6/1987 | Persson | 228/107 |
| 5,611,477 A | * | 3/1997 | Wang | 228/107 |

FOREIGN PATENT DOCUMENTS

DE           3640690 A1 *  6/1988

* cited by examiner

*Primary Examiner* — Kiley Stoner
*Assistant Examiner* — Carlos Gamino
(74) *Attorney, Agent, or Firm* — Brian C. Trask

(57) ABSTRACT

A method for an explosion welding process to form composite pipes, such as for nuclear power equipment. The explosive welding process includes: (1) An explosives preparation method in which low detonation velocity explosives are produced by using powdery emulsion explosives as a base. The base is mixed completely and evenly with a certain amount of powdered pearl salt, wherein the size of the pearl salt particle is 100-200 mesh, and the ratio of emulsion explosives versus pearl salt is between about 3-5:1. (2) A method of inhibiting the negative influence on welding quality caused by the gap between a base tube and a mold, wherein: the roughness of the base tube outer surface is kept less than that of the mold's inner surface, with the difference in surface roughness being maintained within two-grades. In certain cases, a layer of 1.0.±.0.1 mm copper may be added between the outer wall of a base tube and the inner wall of the mold.

2 Claims, 1 Drawing Sheet

EXPLOSION WELDING WITH A MOLD AND COPPER LAYER

CROSS-REFERENCE TO RELATED APPLICATION

This application claims the priority benefit of the filing date of China National Invention Patent Application No. 200910025068.4, for "A Method of Explosion Welding Process on Composite Pipes for Nuclear Power Equipment", filed on Feb. 16, 2009, the entire contents of which are hereby incorporated by this reference.

BACKGROUND OF THE INVENTION

Field

This invention relates generally to an explosive welding process. An exemplary use of the instant method is to form composite pipes for nuclear power equipment.

BRIEF SUMMARY OF THE INVENTION

The invention may be embodied as a method for explosion welding. Preferred embodiments include producing a grain comprising low detonation velocity explosives by combining powdery emulsion explosive as a base. Desirably, the grain is formulated such that the detonation velocity of the low detonation velocity explosives remains in the range from about 1800 m/s to about 2500 m/s during the welding procedure. Sometimes, the base may be mixed completely and evenly with a certain amount of powdered pearl salt. In such case, the size of pearl salt particles is desirably between about 100 and 200 mesh, and the ratio of emulsion explosives versus pearl salt is between about 3:1 and about 5:1 on a mass basis. The collision velocity Vc may also, or alternatively, be modified by removing explosive mass according to the formula $m=0.3r^2$ (g) with every successive 50 mm length of explosive grain, wherein r stands for the inner circle radius of inner tube, and the mass is calculated in grams.

The method typically includes providing a base tube having an inside diameter, disposing an inner tube substantially concentrically inside the outer tube, the inner tube being sized in diameter to cause a spacing s between the inner tube and the base tube, placing the grain inside the inner tube, and then detonating the grain.

In some cases, the diameter gap between inner tube and base tube may be determined according to the formula $s=\epsilon \cdot r$ (mm), wherein: s represents the diameter gap between inner tube and base tube; r represents the average cylindrical radius of inner tube and r is within the range of about 3 to 25 mm; inner tube wall thickness is less than about 0.8 mm, and $\epsilon$ represents the radial strain of inner tube, with a range between about 0.05 to 0.1.

In certain other cases, the diameter gap between inner tube and base tube may be determined according to the formula $s=k\epsilon \cdot r$ (mm), wherein: s represents the diameter gap between inner tube and base tube; r represents the average cylindrical radius of inner tube and r is within the range of about 3 to 25 mm; $\epsilon$ represents the radial strain of inner tube, with a range between about 0.06-0.12; k represents a correction factor of the thickness of wall and the range of k is between about 0.7 to about 0.9, when the thickness of inner tube wall is between about 0.8 to 2.0 mm.

Sometimes, the base tube may be placed into a mold prior to detonating the grain. In certain cases, the negative influence on welding quality caused by a gap between the base tube and the mold may be inhibited by making the surface roughness of the base tube outer surface be less than the surface roughness of the inner surface of the mold, with the difference between surface roughness values for the respective surfaces desirably being held within two-grades. In other cases, the negative influence on welding quality caused by a gap between the base tube and the mold may be inhibited by adding a layer of copper between the outer wall of the base tube and an inner wall of the mold. In one workable arrangement, the copper layer has a thickness between about 0.9 mm and about 1.1 mm.

DETAILED DESCRIPTION OF THE ILLUSTRATED EMBODIMENTS

Reference will now be made to the drawings in which the various elements of the illustrated embodiments will be given numerical designations and in which the invention will be discussed so as to enable one skilled in the art to make and use the invention. It is to be understood that the following description is only exemplary of the principles of the present invention, and should not be viewed as narrowing the claims which follow.

Certain nuclear power equipment requires pipes formed as a combination of alloy steel pipe or tube and industrial pure Aluminum pipe or tube. The Aluminum pipe is arranged to form an inner liner for the outer, or base, pipe.

Figure 1:
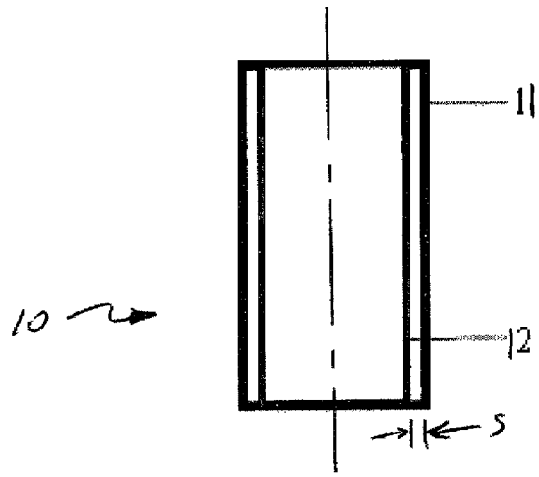
FIG. 1 is a cross-section plan view taken along the axis of tubular elements prior to welding.
Figure 2:
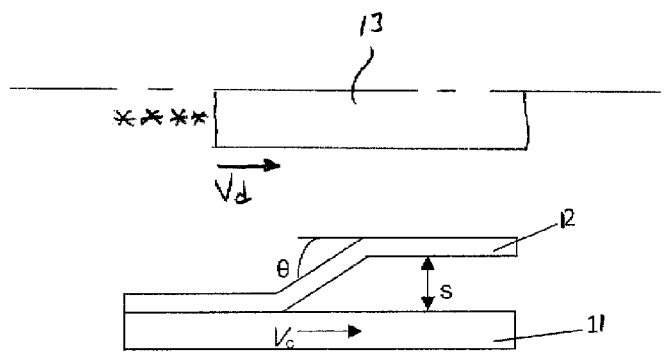
FIG. 2 is a fragment cross-section view in elevation taken along the axis of tubular elements during explosive welding.

With reference to FIG. 1, a composite pipe, or tube, generally indicated at 10 ready for application of an explosive weld structured according to certain aspects of the instant invention includes an outer tube 11 and an inner tube 12. A space s is provided, in part, to facilitate insertion of the inner tube 12 into position inside the outer tube, or base tube 12. FIG. 2 illustrates certain variable that may be manipulated in practice of certain aspects of the invention. Such variables include collision point speed $V_c$, and explosive detonation velocity $V_d$. The grain 13 provides the explosive energy required to make a weld. The collision bending angle θ is effected, in part, by the size of gap s between inner and outer tube diameters.

Figure 3:
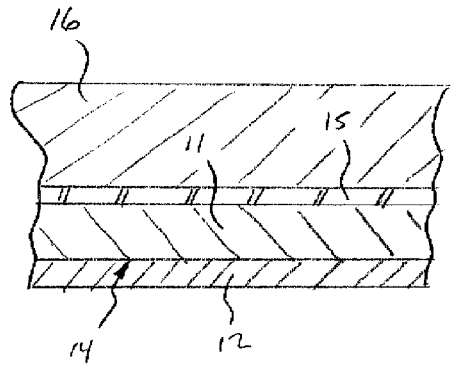
FIG. 3 is a fragment cross-section in elevation taken along the axis of a composite tube that has been welded according to certain aspects of the instant invention and disposed inside a mold.
Figure 4:
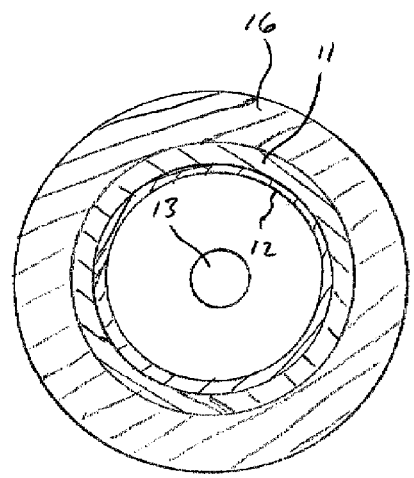
FIG. 4 is a cross-section view in elevation taken transverse to an axis of elements disposed in position to perform a method according to certain aspects of the instant invention.

FIGS. 3 and 4 illustrate optional arrangements for practice of certain aspects of the invention. In FIG. 3, a welded interface, generally 14 is formed between inner tube 12 and outer tube 11. An optional layer of Copper 15 is shown disposed between the outer tube 11 and a mold 16. In FIG. 4, the Copper layer is omitted.

With reference again to FIG. 1, outer tube 11 is typically an alloy steel pipe, also known as a base tube in the explosion welding process. Typical such tubes have an outside diameter in the range between about 15 to about 60 mm. Inner tube 12 is generally formed from an industrial pure Aluminum tube, and is also known as an inner tube in the explosion welding process. An inner tube generally has an outside diameter in the range between about 3 to 25 mm, and a substantially constant wall thickness in the range of about 0.2 to 2.0 mm.

The basic requirements of explosion welding quality to form a composite pipe of the type used in nuclear power equipment are: 1) the percentage of successful welding of inner tube to base tube is essentially 100%; 2) the bonded interface between tubes is in micro-wave shape; and 3) the plastic deformation of the inner tube is under reasonable control.

In order to meet the quality requirements of explosion welding to form composite pipes for nuclear power equipment, this invention provides a method of explosion welding process on composite pipes to ensure essentially 100% successful explosion welding on composite pipes, with high quality micro-wave shaped bonded interface, and able to control the plastic deformation of inner tube. Typically, a micro-wave shape has a wave length no larger than about 20 micro meter. It is usually observed using an electrical scan or metallographic microscope. Plastic deformation of the inner tube is defined as being under reasonable control when the deformation is in the range defined by the empirical formula provided below.

A method including one or more aspect according to certain principles of this invention provides an explosive welding process to form composite pipes of the type that may be used in nuclear power equipment. The process welds one length of pipe all at once. The length of the pipe can be 1.5 to 2 meters, or so. One aspect of the invention includes an explosives preparation method.

Low detonation velocity explosives may be produced by using powdery emulsion explosive as a base. The commercially available Non-TNT industrial explosive base is mixed completely and evenly, in accordance with known techniques, with a certain amount of powdered pearl salt. Desirably, the size of pearl salt particles is 100-200 mesh, and the ratio of emulsion explosives versus pearl salt is between about 3:1 and 5:1.

When loading explosives to form a grain that may be used to weld an inner tube to a base tube, there are two methods to achieve uniform collision velocity between inner tube and base tube along the detonation propagation direction. The first method is to change the recipe of explosives by adding velocity-decreasing additives. The second method is to change the loading density of explosives.

The purpose of using low detonation velocity explosives is to ensure the bonded interface has a micro-wave shape, and thus to minimize the micro-defects on the interface, and to increase the uniformity of the thickness of composite layer. Because the size of interface waves is directly related to the collision velocity between base tube and inner tube, the interface waves increase when the collision velocity increases, thus it becomes easier to form pores and micro-cracks and to introduce larger difference of composite layer thickness in the interface deformation zone. The collision velocity is not only closely related to the detonation velocity, but also gradually increases along the detonation propagation direction.

The collision velocity between inner tube and base tube increases when the detonation velocity increases. Factors that may be manipulated to meet the quality requirements of the composite pipes include: reducing the detonation velocity of the emulsion explosives, and gradually reducing the detonation velocity along the detonation propagation direction. These are the key factors to maintain uniform collision velocity.

There are two methods that may be employed to decrease the detonation velocity. The first method is by adding velocity-decreasing additives. Commercially available pearl salt, especially powdered pearl salt, is used as major component for additives in this invention. Detonation velocity decreases with the increased quantity of pearl salt added. A workable range for the detonation velocity $V_d$ is between about 1600 and 2800 m/s. The size of pearl salt particles is critical. If they are not in the desired range, it is hard to assure that they can mix evenly and thoroughly with the emulsion explosive particles, thus it can not have the function to control the detonation velocity. The detonation velocity is desirably controlled in the range of 1800~2500 m/s. The size of pearl salt particles is desirably controlled between 100 to 200 mesh. The mass ratio of emulsion explosives versus additives may range from about 3:1 to about 5:1 on a weight or mass basis. Along the detonation propagation direction, the detonation velocity may be decreased by about 10-20 m/s for every 50 mm length by changing the mass ratio of emulsion explosives versus additives.

The second method to decrease the detonation velocity is by reducing the loading density of explosives in the grain. This method may be used, for example, when the mass ratio of emulsion explosives versus additive is fixed. In one application, each loading forms a explosive grain of 50 mm length. Along the detonation propagation direction, it has been determined that the velocity $V_c$ may be reduced by the desired amount by removing explosive mass given by the formula: $m=0.3r^2$ (g) with every 50 mm explosive grain reduced, wherein r stands for the inner circle radius of inner tube, and the mass is calculated in grams.

Another aspect of the instant method includes an experimental formula for determining the diameter gap between an inner tube and a base tube. During explosion welding process on composite pipes, it is necessary to ensure oblique impact between inner and base tubes. Thus an appropriate gap s must be maintained between these two tubes.

When the wall thickness of inner tube is fixed, s increases along with the increase of the diameter of the inner tube.

In order to ensure a reliable welding, plastic deformation must take place on inner tube. However, plastic deformation must be under reasonable control, i.e., the plastic strain along the diameter should be as small as possible, in order to reduce micro-defects on the interface between inner tube and base tube of a composite pipe.

When the inner tube wall thickness is constant, r represents the average radius of inner tube, Δr, i.e., gap s, represents the elongation of the average radius of inner tube, and the radial strain change of inner tube is $$\varepsilon = \frac{s}{r}, \text{ i.e., } s = \varepsilon \cdot r \text{(mm)}.$$

Wherein: when r is in the range of 3 to 25 mm, and the thickness of the tube is less than 0.8 mm, the optimized range of ε is 0.05-0.1; ε approaches the high end of the range when the radius is small, and ε approaches the low end of the range when the radius is large. Obviously, when ε is constant, s increases when the inner tube diameter increases.

It has been determined that s desirably increases along with increase of thickness of inner tube wall. With reference to FIG. 2, when the thickness of the inner tube wall increases, additional explosive energy will be required to cause the desired radial plastic deformation and the axial bending deformation of the inner tube, and maintain the force which drives the inner tube to impact the base tube in a high speed. Therefore, the required amount of explosive will increase when the composition of explosives is fixed. An increased amount of explosives will then increase detonation velocity $V_d$. Because the axis of the inner tube and the base tube are parallel to each other, collision point speed $V_c$ shall be equal to explosive detonation velocity $V_d$. Therefore, when $V_c$ increases, s also needs to increase accordingly, in order to ensure constant bending deformation of inner tube along the axial direction, i.e., to ensure constant collision bending angle θ.

Based on the above relationship between s and the two factors, i.e., the diameter of inner tube and the thickness of wall, we derived the formula: s=kε·(mm). Wherein k represents correction factor for wall thickness. After repeated experiments, we found that when the thickness of the inner tube wall is varied in a range between about 0.8 to about 2.0 mm, or more, the value range of k is 0.7~0.9. In addition, with increase of the thickness of inner tube wall, accordingly, k is in the higher end of the value range, and the optimized range of ε is 0.06-0.12.

One aspect of the invention includes a method of inhibiting the negative influence on welding quality caused by the gap between a base tube and a mold in which that base tube may sometimes be held during certain welding procedures.

In order to strictly limit the deformation of base tube, the outer wall of a base tube needs to closely fit the inside wall of mold. Commonly, a mold is made by the same or similar alloy material as the base tube. When the outer wall of the base tube and inner wall of the mold are tightly affixed, a variety of pores will inevitably form through the surface roughness because the hardness of the two surfaces is identical or similar. Since the air density in the pores is far lower than the density of steel, when the inner tube hits the base tube during explosion welding process, reflected waves will produce stress waves which are generated in the pores formed between the base tube and mold.

The reflected waves will have varying degrees of harm on the fresh welded interface. Therefore, sometimes reflected waves are desirably inhibited. The key of the inhibition is to minimize pores between base tube and mold. In that respect, we use two main methods. First, the surface roughness of the base tube outer wall may be maintained at a value less than that of the mold's inner wall. The difference is desirably controlled within two grades. Second, a layer of copper may be added between the surfaces of the base tube outer wall and the mold's inner wall. The thickness of a workable layer of copper can be 1.0±0.1 mm. Workable thickness is in the range of about 0.5 to 2.0 mm, and we recommend 0.9-1.1 mm. Thickness of the copper may also be determined also based on its commercial availability. The roughness and purity is as it is.

The explosives used in this process typically follow the trend of development of civil explosives, and meet the environmental protection requirements. The explosives preparation method is simple; and the detonation velocity varies in a large range. Therefore it can be used for different explosive welding pipes with different thickness. The method to determine the size of gap between base tube and inner tube has been quantified, which reduces trial and error. The percentage of successful explosion welding on composite pipes has reached 100%. The bonded interface is in high quality microwave shape; and the plastic deformation of inner tube is under reasonable control.

EXAMPLES

Example 1

The base tube is made of 1Cr18Ni9Ti stainless steel, with inner diameter of 13 mm, wall thickness of 2 mm, and length of 1550 mm. The inner tube is made of industrial grade aluminum, with inner diameter of 10 mm, wall thickness of 1 mm, and length of 1600 mm. According to the outside diameters of base tube and inner tube, and following the principles of determining the values of ε and k, ε is 0.1, k is 0.8, the gap s between base tube and inner tube is 0.6 mm based on the formula s=kε·r.

The explosive grain loaded inside the inner tube was mixed of emulsion explosives and powdered pearl salt with mass ratio of 3:1. The resulting detonation velocity was 1800 m/s. Examination of explosion welding on composite pipes showed that all the explosion welding were 100% successful except a 7 mm of non-welding zone at both ends of aluminum tube. The interface between the inner and base tube of the composite pipe was in desired micro-wave shape.

Example 2

The base tube was made of 1Cr18Ni9Ti stainless steel, with inner diameter of 20 mm, wall thickness of 2 mm, and length of 1550 mm. The inner tube was made of industrial grade aluminum, with inner diameter of 15 mm, wall thickness of 1.5 mm, and length of 1600 mm. According to the outside diameters of base tube and inner tube, and following the principles of determining the values of ε and k, ε is 0.09, k is 0.85, the gap s between base tube and inner tube is 0.77 mm based on the formula s=kε·r. The explosives loaded in inner tube were mixed of emulsion explosives and powdered pearl salt with mass ratio of 4:1. The detonation velocity was 2200 m/s. Examination of explosion welding on composite pipes showed that all the explosion welding were 100% successful except a 8 mm of non-welding zone at both ends of aluminum tube. The interface between the inner and base tube of the composite pipe was in desired micro-wave shape.

Example 3

The base tube was made of 1Cr18Ni9Ti stainless steel, with inner diameter of 23 mm, wall thickness of 2 mm, and length of 1550 mm. The inner tube was made of industrial grade aluminum, with inner diameter of 18 mm, wall thickness of 1.5 mm, and length of 1600 mm. According to the outside diameters of base tube and inner tube, and following the principles of determining the values of ε and k, ε is 0.085, k is 0.88, the gap s between base tube and inner tube is 0.85 mm based on the formula s=kε·r. The explosives loaded in inner tube were mixed of emulsion explosives and powdered pearl salt with mass ratio of 5:1. The detonation velocity was 2500 m/s.

Examination of explosion welding on composite pipes showed that, all the explosion welding were 100% successful except a 8 mm of non-welding zone at both ends of aluminum tube. The interface between the inner and base tube of the composite pipe was in desired micro-wave shape.

While the invention has been described in particular with reference to certain illustrated embodiments, such is not intended to limit the scope of the invention. The present invention may be embodied in other specific forms without departing from its spirit or essential characteristics. The described embodiments are to be considered as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for explosion welding, comprising:

producing a grain comprising low detonation velocity explosives by combining explosive as a base, said base being mixed completely and evenly with a certain amount of powdered salt, wherein:

the size of salt particles is between about 100 and 200 mesh, and the ratio of explosive versus salt is between about 3:1 and about 5:1 on a mass basis;

providing an outer tube having an inside diameter;

disposing an inner tube substantially concentrically inside said outer tube, said inner tube being sized in diameter to cause a spacing between said inner tube and said outer tube;

placing said grain, inner tube and grain inside said inner tube;

placing said outer tube into a mold prior to detonating said grain;

inhibiting the negative influence on welding quality caused by a gap between said outer tube and said mold by adding a layer of copper between the outer wall of said outer tube and an inner wall of said mold; and detonating said grain.

2. The method according to claim 1, wherein:

said copper layer has a thickness between about 0.9 mm and about 1.1 mm.

* * * * *